US009087206B2

(12) United States Patent
Nakashima

(10) Patent No.: US 9,087,206 B2
(45) Date of Patent: Jul. 21, 2015

(54) INFORMATION PROCESSING APPARATUS, SYSTEM, METHOD, AND STORAGE MEDIUM FOR EXECUTING CONTROL OPERATION AND INDICATING COMPLETION

(75) Inventor: Kousuke Nakashima, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 88 days.

(21) Appl. No.: 13/514,043

(22) PCT Filed: Apr. 12, 2012

(86) PCT No.: PCT/JP2012/060524
§ 371 (c)(1),
(2), (4) Date: Jun. 5, 2012

(87) PCT Pub. No.: WO2012/144540
PCT Pub. Date: Oct. 26, 2012

(65) Prior Publication Data
US 2012/0268768 A1   Oct. 25, 2012

(30) Foreign Application Priority Data

Apr. 20, 2011  (JP) ................. 2011-094378

(51) Int. Cl.
*G06K 15/02* (2006.01)
*G06F 21/60* (2013.01)
*G06F 3/12* (2006.01)
*H04L 29/06* (2006.01)

(52) U.S. Cl.
CPC ............ *G06F 21/608* (2013.01); *G06F 3/1203* (2013.01); *G06F 3/1236* (2013.01); *G06F 3/1259* (2013.01); *G06F 3/1271* (2013.01); *G06F 3/1285* (2013.01); *H04L 63/083* (2013.01)

(58) Field of Classification Search
CPC ......... G06K 15/02; G06F 3/12; G06F 21/608; H04L 67/02; H04L 63/08; H04N 2201/0015; H04N 2201/0094; H04N 2201/3235; H04N 1/00204; H04N 1/00244; H04N 1/00464; H04N 1/00474; H04N 1/32101; H04N 1/4413
USPC ......... 358/1.1, 1.13, 1.15, 400, 401, 434, 435
See application file for complete search history.

(56) References Cited

U.S. PATENT DOCUMENTS 7,327,478 B2 * 2/2008 Matsuda ..................... 358/1.14
2006/0077423 A1   4/2006 Mathieson et al.
(Continued)

FOREIGN PATENT DOCUMENTS

JP   2006-127503 A   5/2006
JP   2007-279974 A   10/2007
(Continued)

OTHER PUBLICATIONS

Japan Patent Office, International Search Report in connection with International Application No. PCT/JP2012/060524, completed on Jun. 27, 2012 (2 pages).
(Continued)

*Primary Examiner* — Thomas D Lee
(74) *Attorney, Agent, or Firm* — Fitzpatrick, Cella, Harper & Scinto

(57) ABSTRACT

In an information processing system of the invention, when authentication using authentication information from a Web browser of an MFP succeeds, a server generates a session ID, and transmits screen information added with the session ID to the Web browser. The Web browser accepts an operation through an operation screen displayed based on the screen information received from the server, and transmits its operation content to the server. The server transmits, to a service provider of the MFP, a request for executing a job corresponding to the operation content, in which a session ID is designated. Upon completion of execution of the job, the service provider transmits, to the server without intervening the Web browser, completion information indicating the execution result and added with the session ID.

14 Claims, 12 Drawing Sheets

(56) References Cited

U.S. PATENT DOCUMENTS

2007/0236730 A1 10/2007 Takeuchi et al.
2011/0239123 A1* 9/2011 Tsujimoto .................... 715/740

FOREIGN PATENT DOCUMENTS

| JP | 2008-077614 A | 4/2008 |
| JP | 2010-170234 A | 8/2010 |
| WO | 2010/150467 A1 | 12/2010 |

OTHER PUBLICATIONS

Japan Patent Office, Written Opinion of the International Search Authority in connection with International Application No. PCT/JP2012/060524, completed on Jun. 27, 2012 (5 pages).

* cited by examiner

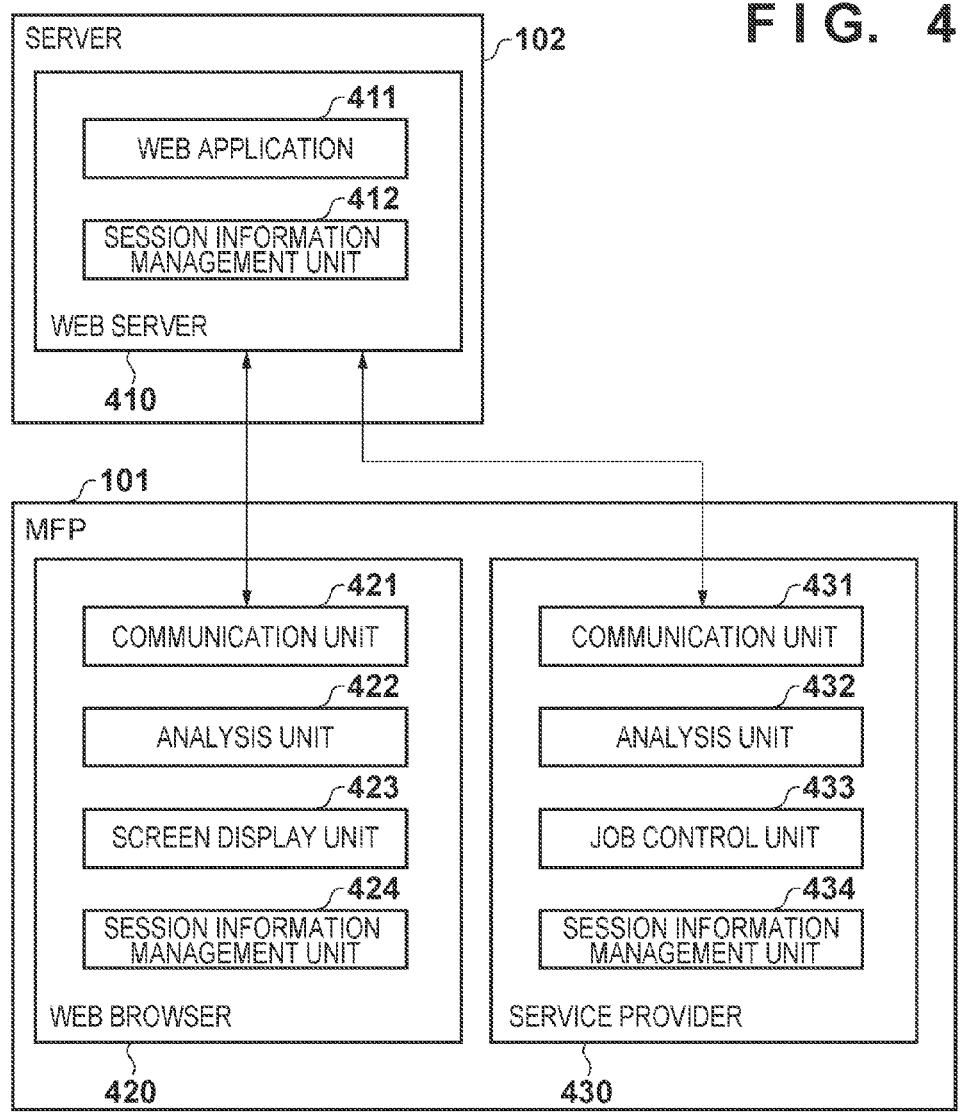

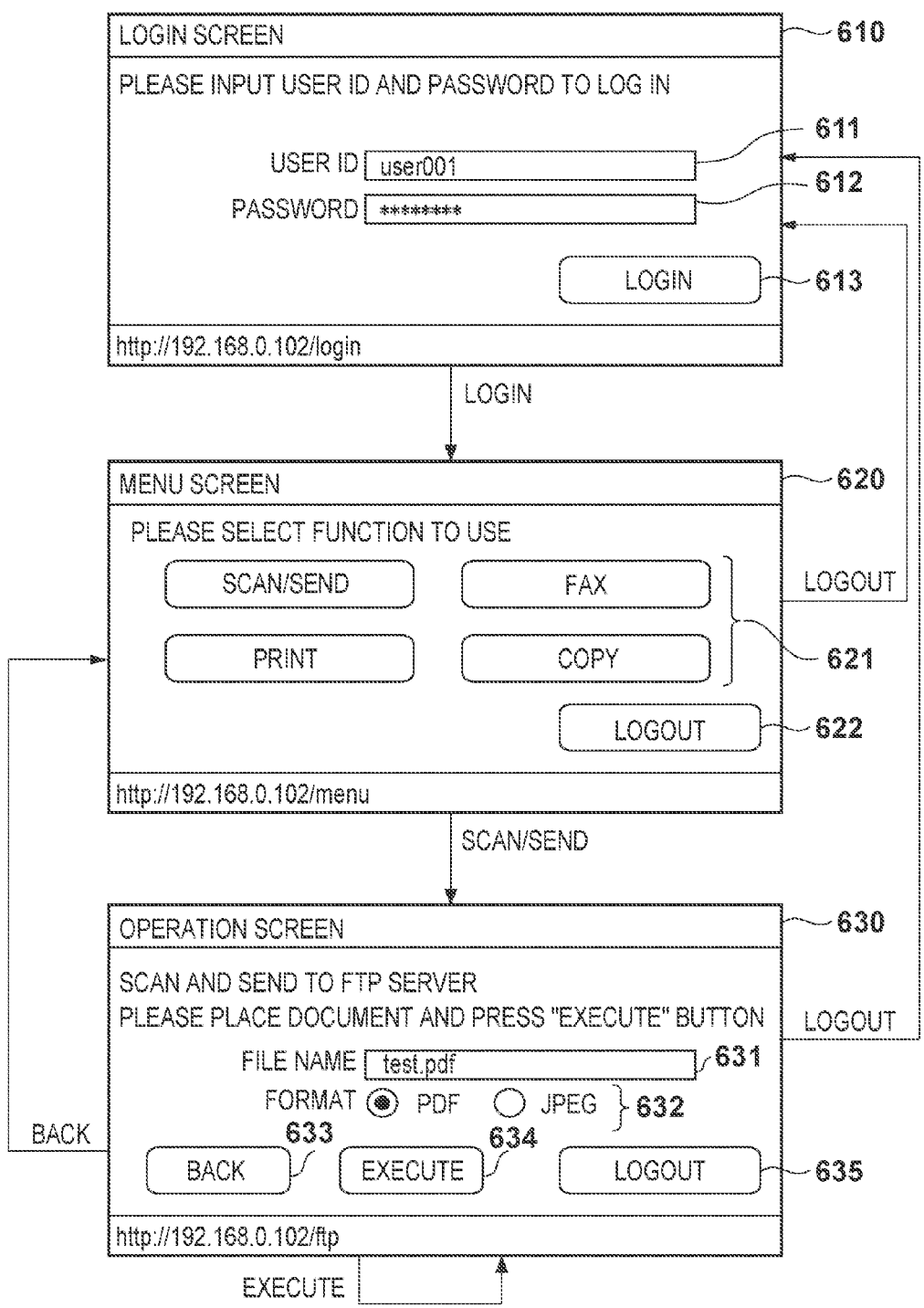

F I G. 8B

804

HTTP/1.1 200 OK
Content-Type: text/html
Set-Cookie: sid=84721340

<html>
<head>
 <title> MENU SCREEN </title>
</head>
<body>
 . . .
</body>
</html>

805

GET /ftp HTTP/1.1
Host: 192.168.0.102
Cookie: sid=84721340

806

HTTP/1.1 200 OK
Content-Type: text/html

<html>
<head>
 <title> OPERATION SCREEN </title>
</head>
<body>

</body>
</html>

FIG. 8C

```
807
POST /ScanToFTP HTTP/1.1
Host: 192.168.0.101
Content-Type: application/soap+xml <?xml version='1.0' ?>
<env:Envelope xmlns:env="http://www.w3.org/2003/05/soap-encoding">
  <env:Body>
    <stftp:PerformJob xmlns:stftp="http://www.canon.com/ns/ScanToFTP/">
      <stftp:jobInstruction>
        <stftp:scanSettings>
          <stftp:resolution>300x300</stftp:resolution>
          <stftp:color>FullColor</stftp:color>
        </stftp:scanSettings>
        <stftp:documentSettings>
          <stftp:documentFormat>Pdf</stftp:documentFormat>
        </stftp:documentSettings>
        <stftp:ftpSettings>
          <stftp:host>192.168.0.103</stftp:host>
          <stftp:fileName>test.pdf</stftp:fileName>
        </stftp:ftpSettings>
        <stftp:resultNotfication>
          <stftp:path>ftp</stftp:path>
          <stftp:cookies>sid=84721340</stftp:cookies>
        </stftp:resultNotfication>
      </stftp:jobInstruction>
    </stftp:PerformJob>
  </env:Body>
</env:Envelope>
```

```
808
POST /ftp HTTP/1.1
Host: 192.168.0.102
Cookie: sid=84721340
Content-Type: application/xml; charset=UTF-8

<?xml version="1.0" encoding="UTF-8"?>
<resultInfo xmlns="http://www.canon.com/ns/ScanToFTP/">
  <jobId>001</jobId>
  <result>SuccessfullyCompleted</result>
</resultInfo>
```

INFORMATION PROCESSING APPARATUS, SYSTEM, METHOD, AND STORAGE MEDIUM FOR EXECUTING CONTROL OPERATION AND INDICATING COMPLETION

CROSS REFERENCE TO RELATED APPLICATIONS

The present application is a U.S. National Stage Entry of International Application No. PCT/JP2012/060524, filed Apr. 12, 2012, which claims priority to Japan Patent Application No. 2011-094378, filed Apr. 20, 2011. The entire disclosure of each prior application is incorporated herein by reference.

TECHNICAL FIELD

The present invention relates to an information processing apparatus such as a Multi Function Peripheral (MFP), an information processing system including an information processing apparatus, a control method therefor, and a storage medium.

BACKGROUND ART

An information processing apparatus such as a PC generally displays an operation screen on its display unit based on information provided by a server apparatus such as a Web server on a network. For example, the information processing apparatus requests, of the Web server on the network, screen information necessary for a Web browser to display an operation screen on the display unit. Upon receiving the request, the Web server transmits, as a response to the request, HTML data corresponding to the screen information for the Web browser to display the operation screen to the information processing apparatus. The Web browser of the information processing apparatus analyzes the received HTML data, and displays, on its display unit, an operation screen based on the description of the analyzed HTML data. Furthermore, upon accepting a user instruction input through the displayed operation screen, the Web browser notifies the Web server of the input instruction. Upon receiving the notification, the Web application of the Web server executes processing according to the sent instruction.

In recent years, as will be described later, some MFPs including a scanner and printer have a Web browser as described above. Such an MFP displays, on its display unit by the Web browser, an operation screen based on screen information which has been provided by a Web server according to the above-described procedure. Furthermore, the MFP accepts various kinds of instructions from the user through the displayed operation screen.

For example, Japanese Patent Laid-Open No. 2006-127503 has proposed a method in which a Web server provides an MFP with screen information of an operation screen used to allow the user to input an instruction for using a function of the MFP. In Japanese Patent Laid-Open No. 2006-127503, the user of the MFP inputs an instruction for the MFP through the operation screen displayed by a Web browser. The Web browser of the MFP notifies the Web server of the input instruction. Upon receiving the notification, the Web server transmits, to the MFP according to a communication protocol such as SOAP (Simple Object Access Protocol), control data for controlling the MFP in order to cause the MFP to execute processing according to the content of the sent instruction. With this operation, the Web server requests the MFP to execute processing according to the control data. Upon receiving the request, the MFP executes the requested processing. According to Japanese Patent Laid-Open No. 2006-127503, executing such processing between the Web server and the MFP eliminates the need to hold, within the MFP, all menu data for operating the MFP. Furthermore, it is possible to readily change the menu data on the Web server instead of the MFP.

When such a Web server is connected with an unspecified client, it generally requests, for each session, user authentication of the client as a connection source. If the Web server executes authentication processing, it often uses form authentication as an authentication method in which an authentication screen for authentication can be readily customized on the Web server side. In this case, the Web application of the Web server provides the client with a form for authentication. Upon completion of client authentication by form authentication, the Web server issues a session ID to be used for a session which is established between the server itself and the client, and transmits it as an HTTP response to the client. The client sets the received session ID in an HTTP request to be transmitted to the server. This procedure enables the client and server to execute subsequent communication as an authenticated session.

Authentication methods other than the form authentication may be used between a Web server and a client. For example, Japanese Patent Laid-Open No. 2008-077614 has described that authentication is performed by SOAP communication according to SOAP. In this case, a client can obtain a session ID by sending an HTTP request to a temporary URL which has been returned with a SOAP response by a Web server after authentication by SOAP communication. By setting the obtained session ID in an HTTP request to be transmitted to the Web server, the client can execute communication with the Web server as an authenticated session like the above-described form authentication.

As in Japanese Patent Laid-Open No. 2006-127503, assume that the Web server executes a device control operation for controlling a device such as a scanner or printer of the MFP by SOAP communication. In this case, in order for the Web server to recognize that the MFP has completed processing requested by the device control operation by the Web server, the MFP needs to notify the Web server of it. If, for example, the device control operation is executed according to SOAP as in Japanese Patent Laid-Open No. 2006-127503, the MFP need only notify the Web server of data indicating completion of the control operation as a SOAP response after the control operation is completed.

Some jobs executed by the MFP by the above-described device control operation, however, may require a long time to complete. If, for example, a print job using a printer is executed, it may take a certain time to complete discharge of a printed paper sheet. In this case, a response time from when the MFP receives a device control request as a SOPA request until it notifies the Web server of completion of the control operation as a SOAP response may become long. This is undesirable in terms of the load on the Web server. To reduce the load on the Web server, for example, the MFP transmits a SOAP response to the Web server in advance upon receiving a SOAP request associated with a device control operation from the Web server. Then, when the requested control operation is complete, the MFP need only transmit a completion notification indicating it to the Web server.

As described above, if the Web server requests authentication when the MFP transmits a device control completion notification, the MFP cannot transmit it to the Web server before the MFP completes authentication by an authentication method requested by the Web server. If, for example, an authentication method requested by the Web server is form authentication, the MFP has to execute authentication according to a form different for each Web server to transmit a completion notification. On the other hand, if authentication methods (for example, an authentication protocol like HTTP authentication) other than the form authentication are requested by the Web server, the MFP needs to support the authentication methods other than the form authentication.

SUMMARY OF INVENTION

The present invention has been made in consideration of the above problems, and provides a technique in which when a server requests an information processing apparatus to execute a control operation, the apparatus notifies the server of completion of the control operation without authentication processing.

According to one aspect of the present invention, there is provided an information processing system comprising a server apparatus and an information processing apparatus capable of communicating with the server apparatus, which includes a display control unit for performing control to display an operation screen on a display unit using screen information provided by the server apparatus, and an execution control unit for performing control to execute a job corresponding to an instruction from the server apparatus, the server apparatus comprising: generation means for generating, when authentication using authentication information received from the display control unit succeeds, a session identifier to be used for communication with the display control unit; means for transmitting the screen information added with the session identifier generated by the generation means to the display control unit; means for transmitting, upon receiving from the display control unit an operation content on the operation screen based on the screen information, an instruction for executing a job corresponding to the operation content to the execution control unit; designation means for designating, for the execution control unit, as a session identifier to be used for communication from the execution control unit to the server apparatus, the session identifier generated by the generation means; and reception means for receiving completion information indicating an execution result of the job corresponding to the instruction from the execution control unit, the display control unit of the information processing apparatus comprising: means for displaying the operation screen on the display unit using the screen information received from the server apparatus; and means for transmitting, to the server apparatus, the operation content on the operation screen, and the execution control unit of the information processing apparatus comprising: execution means for executing, upon receiving the instruction from the server apparatus, the job corresponding to the instruction; and means for transmitting, upon completion of execution of the job, to the server apparatus without intervening the display control unit, completion information indicating an execution result of the job and added with the session identifier designated by the designation means.

According to another aspect of the present invention, there is provided an information processing system comprising a server apparatus and an information processing apparatus capable of communicating with the server apparatus, which includes a display control unit for performing control to display an operation screen on a display unit using screen information provided by the server apparatus, and an execution control unit for performing control to execute a job corresponding to an instruction from the server apparatus, the server apparatus comprising: generation means for generating, when authentication using authentication information received from the display control unit succeeds, a session identifier to be used for communication with the display control unit; means for transmitting the screen information added with the session identifier generated by the generation means to the display control unit; means for transmitting, upon receiving from the display control unit an operation content on the operation screen based on the screen information, an instruction for executing a job corresponding to the operation content to the execution control unit; and reception means for receiving completion information indicating an execution result of the job corresponding to the instruction from the execution control unit, the display control unit of the information processing apparatus comprising: means for displaying the operation screen on the display unit using the screen information received from the server apparatus; and means for transmitting, to the server apparatus, the operation content on the operation screen, and the execution control unit of the information processing apparatus comprising: means for executing, upon receiving the instruction from the server apparatus, the job corresponding to the instruction; and transmission means for transmitting, upon completion of execution of the job, to the server apparatus without intervening the display control unit, completion information indicating an execution result of the job and added with the session identifier used for communication between the display control unit and the server apparatus.

According to still another aspect of the present invention, there is provided an information processing apparatus capable of communicating with a server apparatus, which includes a display control unit for performing control to display an operation screen on a display unit using screen information provided by the server apparatus, and an execution control unit for performing control to execute a job corresponding to an instruction from the server apparatus, the display control unit comprising: means for receiving, in response to success of authentication using authentication information transmitted to the server apparatus, the screen information added with a session identifier which has been generated by the server apparatus as a session identifier to be used for communication between the display control unit and the server apparatus, and displaying the operation screen on the display unit using the screen information; and means for transmitting, to the server apparatus, an operation content on the operation screen, and the execution control unit comprising: execution means for executing, upon receiving an instruction for executing a job corresponding to the operation content, the job corresponding to the instruction; and means for transmitting, upon completion of execution of the job, to the server apparatus without intervening the display control unit, completion information indicating an execution result of the job and added with the session identifier which has been generated by the server apparatus and designated as a session identifier to be used for communication from the execution control unit to the server apparatus.

According to yet another aspect of the present invention, there is provided an information processing apparatus capable of communicating with a server apparatus, which includes a display control unit for performing control to display an operation screen on a display unit using screen information provided by the server apparatus, and an execution control unit for performing control to execute a job corresponding to an instruction from the server apparatus, the display control unit comprising: means for receiving, in response to success of authentication using authentication information transmitted to the server apparatus, the screen information added with a session identifier which has been generated by the server apparatus as a session identifier to be used for communication between the display control unit and the server apparatus, and displaying the operation screen on the display unit using the screen information; and means for transmitting, to the server apparatus, an operation content on the operation screen, and the execution control unit comprising: execution means for executing, upon receiving an instruction for executing a job corresponding to the operation content from the server apparatus, the job corresponding to the instruction; and means for transmitting, upon completion of execution of the job, to the server apparatus without intervening the display control unit, completion information indicating an execution result of the job and added with the session identifier used for communication between the display control unit and the server apparatus.

According to still yet another aspect of the present invention, there is provided a control method for an information processing system comprising a server apparatus and an information processing apparatus capable of communicating with the server apparatus, which includes a display control unit for performing control to display an operation screen on a display unit using screen information provided by the server apparatus, and an execution control unit for performing control to execute a job corresponding to an instruction from the server apparatus, the method comprising causing the server apparatus to execute: a generation step of generating, when authentication using authentication information received from the display control unit succeeds, a session identifier to be used for communication with the display control unit; a step of transmitting the screen information added with the session identifier generated in the generation step to the display control unit; and a step of transmitting, upon receiving from the display control unit an operation content on the operation screen based on the screen information, an instruction for executing a job corresponding to the operation content to the execution control unit; a designation step of designating, for the execution control unit, as a session identifier to be used for communication from the execution control unit to the server apparatus, the session identifier generated in the generation step; and a reception step of receiving completion information indicating an execution result of the job corresponding to the instruction from the execution control unit, causing the display control unit of the information processing apparatus to execute: a step of displaying the operation screen on the display unit using the screen information received from the server apparatus; and a step of transmitting, to the server apparatus, the operation content on the operation screen, and causing the execution control unit of the information processing apparatus to execute: an execution step of executing, upon receiving the instruction from the server apparatus, the job corresponding to the instruction; and a step of transmitting, upon completion of execution of the job, to the server apparatus without intervening the display control unit, completion information indicating an execution result of the job and added with the session identifier designated in the designation step.

According to yet still another aspect of the present invention, there is provided a control method for an information processing system comprising a server apparatus and an information processing apparatus capable of communicating with the server apparatus, which includes a display control unit for performing control to display an operation screen on a display unit using screen information provided by the server apparatus, and an execution control unit for performing control to execute a job corresponding to an instruction from the server apparatus, the method comprising causing the server apparatus to execute: a generation step of generating, when authentication using authentication information received from the display control unit succeeds, a session identifier to be used for communication with the display control unit; a step of transmitting the screen information added with the session identifier generated in the generation step to the display control unit; a step of transmitting, upon receiving from the display control unit an operation content on the operation screen based on the screen information, an instruction for executing a job corresponding to the operation content to the execution control unit; and a reception step of receiving completion information indicating an execution result of the job corresponding to the instruction from the execution control unit, causing the display control unit of the information processing apparatus to execute: a step of displaying the operation screen on the display unit using the screen information received from the server apparatus; and a step of transmitting, to the server apparatus, the operation content on the operation screen, and causing the execution control unit of the information processing apparatus to execute: a step of executing, upon receiving the instruction from the server apparatus, the job corresponding to the instruction; and a transmission step of transmitting, upon completion of execution of the job, to the server apparatus without intervening the display control unit, completion information indicating an execution result of the job and added with the session identifier used for communication between the display control unit and the server apparatus.

According to still yet another aspect of the present invention, there is provided a control method for an information processing apparatus capable of communicating with a server apparatus, which includes a display control unit for performing control to display an operation screen on a display unit using screen information provided by the server apparatus, and an execution control unit for performing control to execute a job corresponding to an instruction from the server apparatus, the method comprising causing the display control unit to execute: a step of receiving, in response to success of authentication using authentication information transmitted to the server apparatus, the screen information added with a session identifier which has been generated by the server apparatus as a session identifier to be used for communication between the display control unit and the server apparatus, and displaying the operation screen on the display unit using the screen information; and a step of transmitting, to the server apparatus, an operation content on the operation screen, and causing the execution control unit to execute: a step of executing, upon receiving an instruction for executing a job corresponding to the operation content from the server apparatus, the job corresponding to the instruction; and a step of transmitting, upon completion of execution of the job, to the server apparatus without intervening the display control unit, completion information indicating an execution result of the job and added with the session identifier which has been generated by the server apparatus and designated as a session identifier to be used for communication from the execution control unit to the server apparatus.

According to yet still another aspect of the present invention, there is provided a control method for an information processing apparatus capable of communicating with a server apparatus, which includes a display control unit for performing control to display an operation screen on a display unit using screen information provided by the server apparatus, and an execution control unit for performing control to execute a job corresponding to an instruction from the server apparatus, the method comprising causing the display control unit to execute: a step of receiving, in response to success of authentication using authentication information transmitted to the server apparatus, the screen information added with a session identifier which has been generated by the server apparatus as a session identifier to be used for communication between the display control unit and the server apparatus, and displaying the operation screen on the display unit using the screen information; and a step of transmitting, to the server apparatus, an operation content on the operation screen, and causing the execution control unit to execute: a step of executing, upon receiving an instruction for executing a job corresponding to the operation content from the server apparatus, the job corresponding to the instruction; and a step of transmitting, upon completion of execution of the job, to the server apparatus without intervening the display control unit, completion information indicating an execution result of the job and added with the session identifier used for communication between the display control unit and the server apparatus.

According to the present invention, it is possible to provide a technique in which when a server requests an information processing apparatus to execute a control operation, the apparatus notifies the server of completion of the control operation without authentication processing.

Further features of the present invention will become apparent from the following description of exemplary embodiments (with reference to the attached drawings).

BRIEF DESCRIPTION OF DRAWINGS

FIG. 4 is a block diagram showing the software configuration of the information processing system 100 according to the first embodiment of the present invention;

FIG. 5 is a schematic view showing a session information management table according to the first embodiment of the present invention;

FIG. 6 is a view showing an example of screen transitions occurring in processing in the information processing system 100 according to the first embodiment of the present invention;

FIGS. 8A to 8C are views each showing an example of information transmitted/received between the MFP 101 and the server 102 in the information processing system 100 according to the first embodiment of the present invention;

DESCRIPTION OF EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

Hardware Configuration of Information Processing System 100

Figure 1:
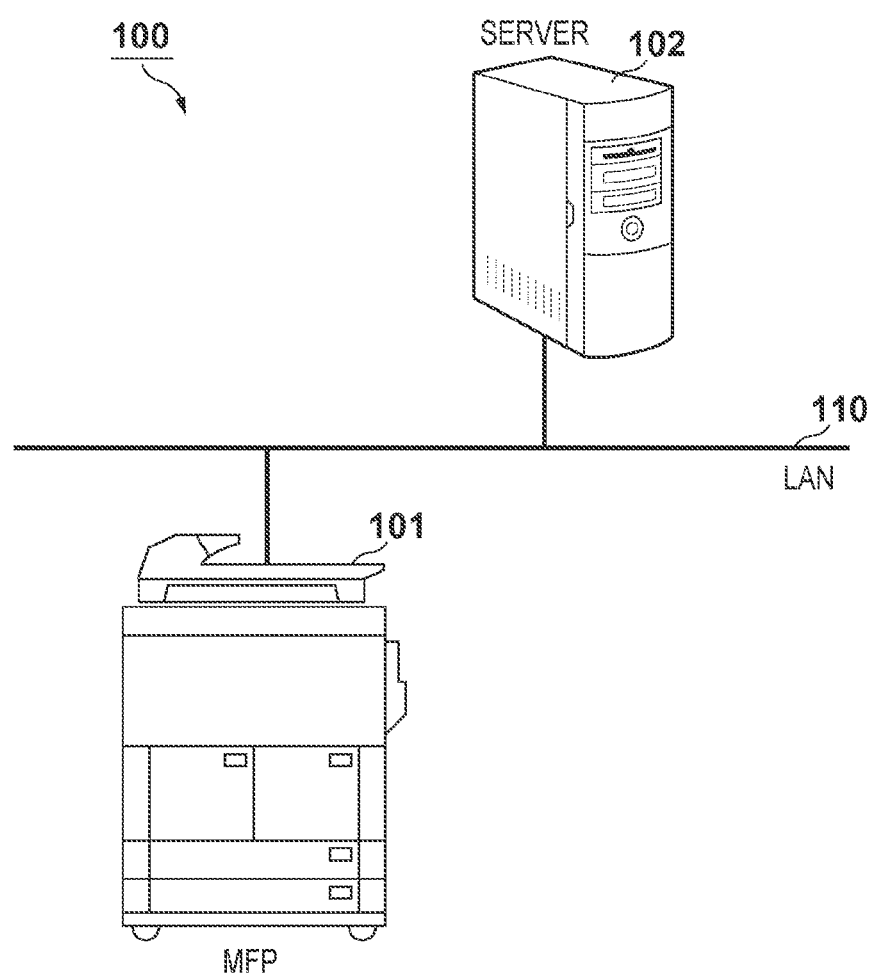
FIG. 1 is a view showing the overall configuration of an information processing system 100 according to the first embodiment of the present invention.

The first embodiment of the present invention will be described first. FIG. 1 is a view showing the whole information processing system 100 according to the first embodiment. An MFP 101 and a server 102 are communicably connected with a LAN 110. Although FIG. 1 shows a case in which one MFP 101 and one server 102 are connected with the LAN 110 as an example of a network, any numbers of MFPs 101 and servers 102 may be connected with the LAN 110. Note that in the embodiment, the server 102 is an example of a server apparatus, and the MFP 101 is an example of an information processing apparatus capable of communicating with the server apparatus.

Figure 2:
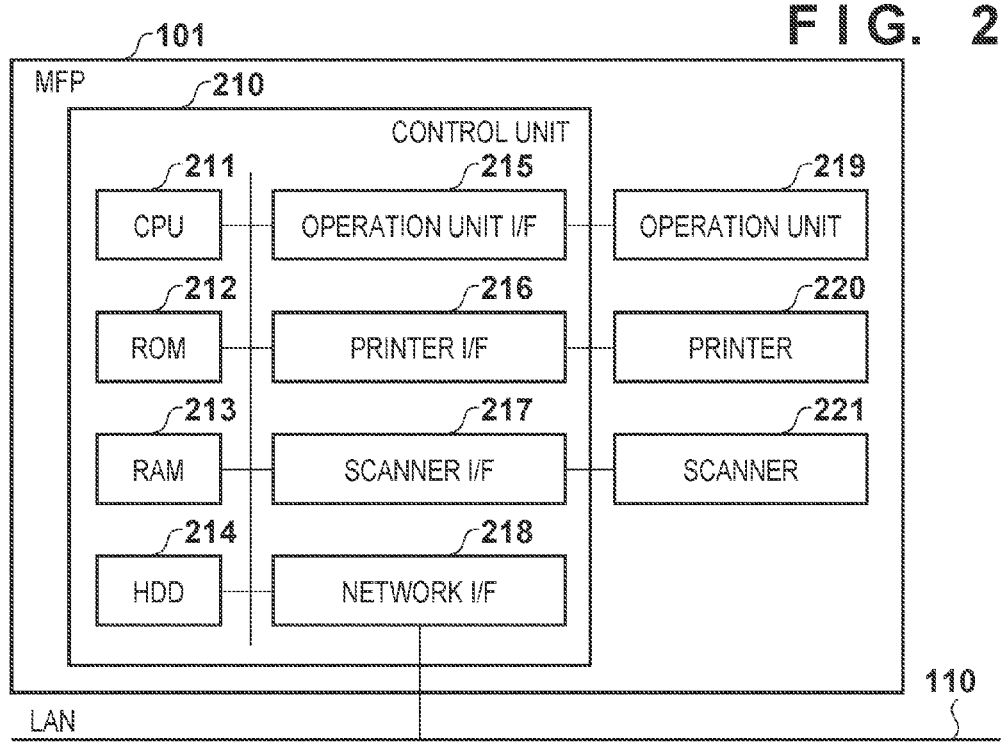
FIG. 2 is a block diagram showing the arrangement of an MFP 101 according to the first embodiment of the present invention.

FIG. 2 is a block diagram showing the arrangement of the MFP 101. The MFP 101 includes devices such as a control unit 210 for controlling the operation of the MFP 101 as a whole, an operation unit 219, a printer 220, and a scanner 221. The MFP 101 includes a CPU 211 which reads out, into a RAM 213, control programs stored in a ROM 212, and performs various control operations such as a print control operation, a read control operation, and a transmission control operation. The RAM 213 is used as a main memory for the CPU 211 and as a temporary storage area such as a work area. An HDD 214 stores image data and various kinds of programs, or various kinds of information tables (to be described later).

An operation unit interface (I/F) 215 functions as an interface connecting the operation unit 219 with the control unit 210. The operation unit 219 includes a keyboard and a liquid crystal display (LCD) unit having a touch panel function. The LCD unit functions as a display unit for displaying various kinds of information. The LCD unit and keyboard function as a user interface used by the user to input various kinds of information and instructions to the MFP 101. As will be described later, the MFP 101 includes a Web browser as one of functions which are implemented by executing control programs. The Web browser of the MFP 101 analyzes HTML data received as image information from the server 102, and displays an operation screen based on the description of the received HTML data on the LCD unit of the operation unit 219.

A printer I/F 216 functions as an interface connecting the printer 220 with control unit 210. Image data to be printed by the printer 220 is transferred from the control unit 210 via the printer I/F 216. The printer 220 prints an image on a recording medium based on the transferred image data. A scanner I/F 217 functions as an interface connecting the scanner 221 with the control unit 210. The scanner 221 reads an image on a document to generate image data, and inputs the generated image data to the control unit 210 via the scanner I/F 217.

A network I/F 218 functions as an interface connecting the control unit 210 (MFP 101) with the LAN 110. The network I/F 218 transmits image data and various kinds of information to an external apparatus (for example, the server 102) on the LAN 110, and receives various kinds of information from an external apparatus on the LAN 110.

Figure 3:
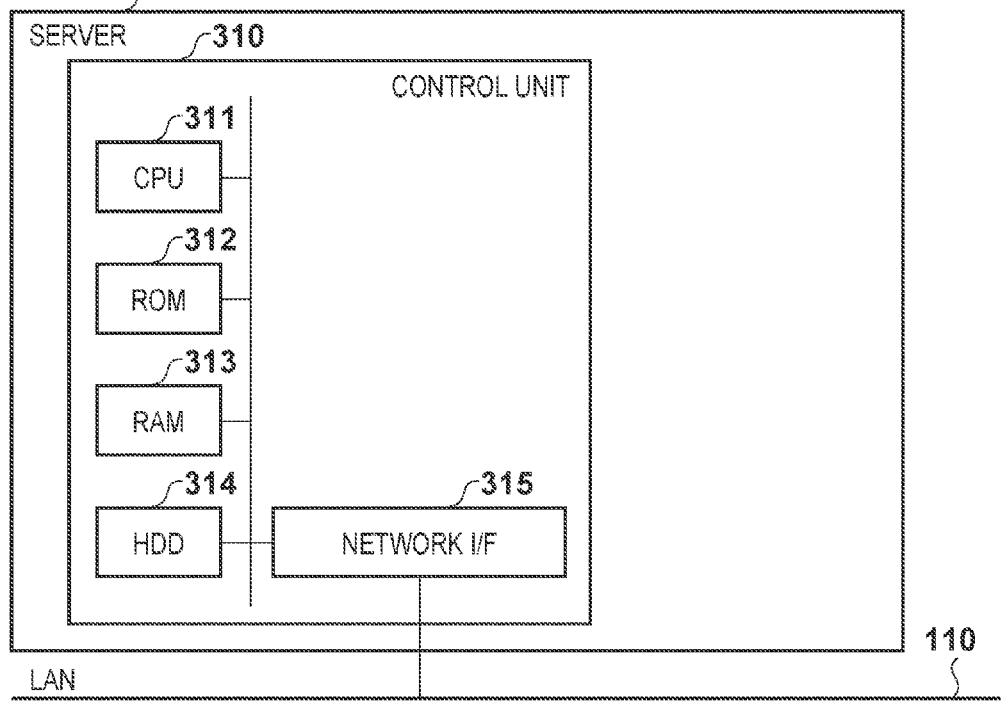
FIG. 3 is a block diagram showing the arrangement of a server 102 according to the first embodiment of the present invention.

FIG. 3 is a block diagram showing the arrangement of the server 102. A control unit 310 including a CPU 311 controls the operation of the server 102 as a whole. The CPU 311 reads out, into a RAM 313, control programs stored in a ROM 312, and executes various control operations. The RAM 313 is used as a main memory for the CPU 311 and as a temporary storage area such as a work area. An HDD 314 stores image data and various kinds of programs. A network I/F 315 functions as an interface connecting the control unit 310 (server 102) with the LAN 110. The network I/F 315 transmits/receives various kinds of information to/from another apparatus on the LAN 110.

<Software Configuration of Information Processing System 100>

FIG. 4 is a block diagram showing the software configuration of the whole information processing system 100. Each function unit shown in FIG. 4 is implemented when the CPU 211 of the MFP 101 or the CPU 311 of the server 102 executes a control program. The MFP 101 includes a Web browser 420 and a service provider 430 as function units which are implemented when the CPU 211 executes control programs. The server 102 includes a Web server 410 as a function unit which is implemented when the CPU 311 executes a control program. Note that in the embodiment, the Web browser 420 functions as an example of a display control unit for performing control to display, on the display unit, an operation screen using screen information provided by a server apparatus. The service provided 430 functions as an example of an execution control unit for performing control to execute a job according to an instruction from a server apparatus.

The Web server 410 of the server 102 can communicate with each of the Web browser 420 and service provider 430 of the MFP 101 via the LAN 110. The configuration of the Web browser 420 and service provider 430 of the MFP 101 and the Web server 410 of the server 102 will be described in detail below.

(MFP101)

The Web browser 420 has a communication unit 421, an analysis unit 422, a screen display unit 423, and a session information management unit 424. According to the HTTP protocol, the communication unit 421 transmits a request to a Web application 411 of the server 102, and receives a response to the request from the Web application 411. The MFP 101 transmits an HTTP request using the communication unit 421 to request, of the Web application 411, HTTP data corresponding to screen information for displaying an operation screen on the LCD unit of the operation unit 219 by the Web browser 420. The communication unit 421 notifies the Web application 411 of the server 102 of information input by the user through the operation screen displayed by the Web browser 420.

The analysis unit 422 analyzes an HTTP response received from the Web application 411. The HTTP response contains HTML data describing the contents of the operation screen to be displayed by the Web browser 420. In the HTTP response, a cookie representing session information to be set in an HTTP request which is sent to the Web application 411 may have been designated. The screen display unit 423 displays the operation screen on the LCD unit of the operation unit 219 based on the result of analyzing the HTTP response by the analysis unit 422. Note that the session information contains a session ID (a session identifier or session identification information) for identifying a session established between the MFP 101 and the server 102. In this embodiment, a cookie is used as a session ID (SID).

Based on the result of the analysis by the analysis unit 422, the session information management unit 424 stores, in a session information management table, the cookie (session ID) designated in the HTTP response. FIG. 5 is a schematic view showing an example of the session information management table. The session information management table includes a domain name and a cookie. FIG. 5 shows a case in which when a Web server 410 indicated by a domain name "192.168.0.102" designates a cookie "SID=84721340", the domain name and cookie are stored in the session information management table. In this case, when the communication unit 421 transmits an HTTP request to the Web server 410 indicated by the domain name "192.168.0.102", it sets (adds) the cookie "SID=84721340" in the HTTP request. Note that communication operations using the same cookie between the MFP 101 and the server 102 are identified as communication operations in the same session.

The service provider 430 includes a communication unit 431, an analysis unit 432, a job control unit 433, and a session information management unit 434. The communication unit 431 receives a SOAP request from the Web application 411, and transmits a SOAP response to the Web application 411. Note that the SOAP request is a control request for the server 102 to request the MFP 101 to execute, for example, print processing by the printer 220, read processing by the scanner 221, or transmission processing via the network I/F 218. An instruction for controlling a device of the MFP 101 is described in the SOAP request. The analysis unit 432 analyzes the SOAP request received by the communication unit 431, and obtains control instructions contained in it.

The job control unit 433 generates a job for executing the control instructions analyzed by the analysis unit 432. The job control unit 433 executes the generated job to execute print processing by the printer 220, read processing by the scanner 221, transmission processing via the network I/F 218, or the like. Upon completion of execution of the generated job, the job control unit 433 instructs the communication unit 431 to transmit a completion information notification (completion notification) indicating the execution result of the job to the Web application 411 according to the SOAP request. Note that the job control unit 433 holds the contents of the SOAP request in association with the job in progress from when the job is generated until the completion notification is sent.

The session information management unit 434 manages information about a session established between the server 102 and MFP 101. Based on the result of the analysis by the analysis unit 432, the session information management unit 434 stores in a session information management table and manages a cookie designated in the SOAP request and contained in job completion notification information. The session information management table managed by the session information management unit 434 is similar to that shown in FIG. 5, and includes a domain name and a cookie.

(Server 102)

The Web server 410 includes the Web application 411 and a session information management unit 412. The Web server 410 receives information transmitted as a request by the Web browser 420 of the MFP 101, and causes the Web application 411 to execute processing based on the received information. Furthermore, the Web server 410 transmits, as a response to the request from the Web browser 420, HTML data obtained by the processing of the Web application 411 to the MFP 101. The HTML data transmitted at this time contains a description indicating the contents of an operation screen to be displayed by the Web browser 420 of the MFP 101.

In response to the request from the Web browser 420, the Web application 411 generates HTML data indicating screen information of the operation screen to be displayed by the Web browser 420. The Web application 411 also generates a cookie for identifying a session established between the application 411 itself and the Web browser 420, and generates a control request for processing to be executed by the service provider 430. The Web server 410 transmits, as an HTTP response, the generated HTML data and cookie to the communication unit 421 of the Web browser 420. On the other hand, the Web application 411 transmits, as a SOAP request, the control request to the communication unit 431 of the service provider 430.

The session information management unit 412 manages information about a session established between the server 102 and the MFP 101. For example, the session information management unit 412 saves or deletes a cookie managed by itself according to a request from the Web application 411.

<Processing Procedure in Information Processing System 100>

An overview of the system configuration in this embodiment has been described. A processing procedure executed in the information processing system 100 according to the embodiment will be explained below. FIG. 6 is a view showing an example of screen transitions occurring in processing in the information processing system 100 according to the embodiment. A login screen 610, menu screen 620, and operation screen 630 shown in FIG. 6 are examples of a screen which is displayed on the LCD unit of the operation unit 219 when the Web browser 420 processes screen information (HTML data) generated by the Web application 411 of the server 102.

The login screen 610 is an example of a screen for form authentication, and includes a user ID field 611 for inputting a user ID, a password field 612 for inputting a password, and a "login" button 613. The user can input a user ID and password as authentication information through the login screen 610. The "login" button 613 is used to request, of the Web application 411, authentication based on the user ID and password transmitted from the Web browser 420 to the Web application 411.

The authentication information input through the login screen 610 is transmitted from the Web browser 420 to the Web application 411 upon press of the "login" button 613, and is used for authentication processing executed by the Web application 411. When the "login" button 613 is pressed and authentication by the Web application 411 succeeds, the Web browser 420 causes the screen to transit from the login screen 610 to the menu screen 620 based on the information transmitted by the Web application 411.

The menu screen 620 is used to prompt the user to select one of the functions of the MFP 101. The menu screen 620 includes various function buttons 621 and a "logout" button 622. When one of the function buttons 621 is pressed, the Web browser 420 causes the screen to transit to an operation screen corresponding to the selected function. When the "logout" button 622 is pressed, the Web browser 420 causes the screen to transit from the menu screen 620 to the login screen 610.

The operation screen 630 is an operation screen for using a scan/send function when "scan/send" is selected on the menu screen 620. The operation screen 630 includes a file name designation field 631, a file format designation area 632, an "execute" button 634, a "back" button 633, and a "logout" button 635. When the "execution" button is pressed, the Web browser 420 reads a document by the scanner to generate an image file, and transmits the generated image data to an FTP server. When the "back" button 633 is pressed, the Web browser 420 causes the screen to transit to the menu screen 620. When the "logout" button 635 is pressed, the Web browser 420 causes the screen to transit to the login screen 610.

Figure 7:
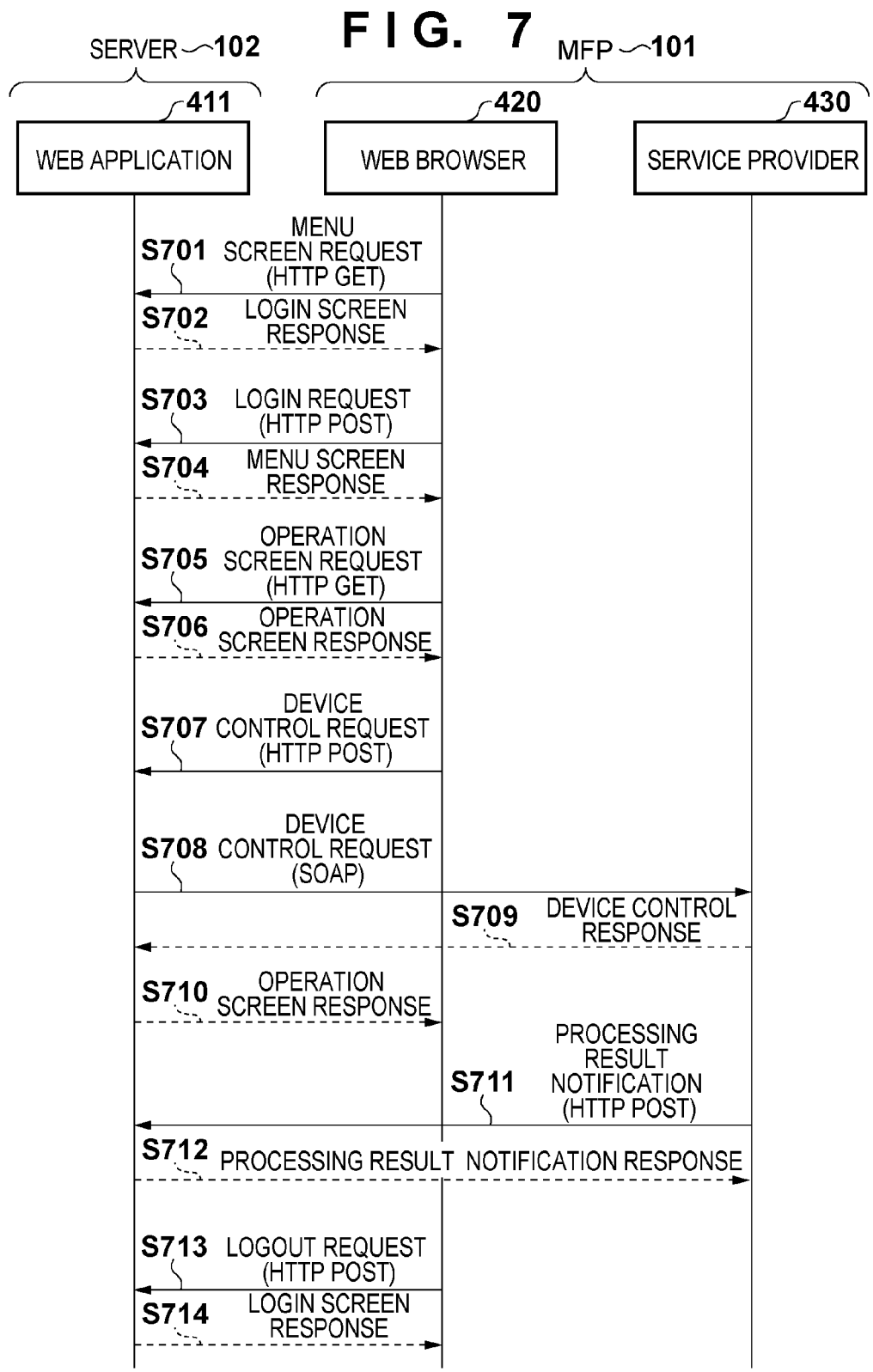
FIG. 7 is a sequence chart showing a processing procedure in the information processing system 100 according to the first embodiment of the present invention.

FIG. 7 is a sequence chart showing a processing procedure in the information processing system 100 according to the embodiment.

In step S701, the Web browser 420 transmits an HTTP request for requesting the menu screen 620 to the Web server 410 (server 102). Reference numeral 801 in FIG. 8A denotes an example of the HTTP request transmitted in step S701. In this example, the Web browser 420 requests, of the Web server 410 (server 102) indicated by a host name "192.168.0.102", a menu screen indicated by a path name "menu" using the GET method. Note that as shown in the example 801 of FIG. 8A, a cookie serving as a session ID has not been set in the HTTP request.

In step S702, upon receiving the first HTTP request for requesting the menu screen 620, the Web application 411 transmits, as a response, an HTTP response containing the HTML data of the login screen 610 to the Web browser 420. In step S702, the Web application 411 first determines whether the HTTP request is added with a cookie. If the Web application 411 determines that the HTTP request is not added with a cookie, it requests authentication information for authentication of the Web browser 420.

Figure 8A:
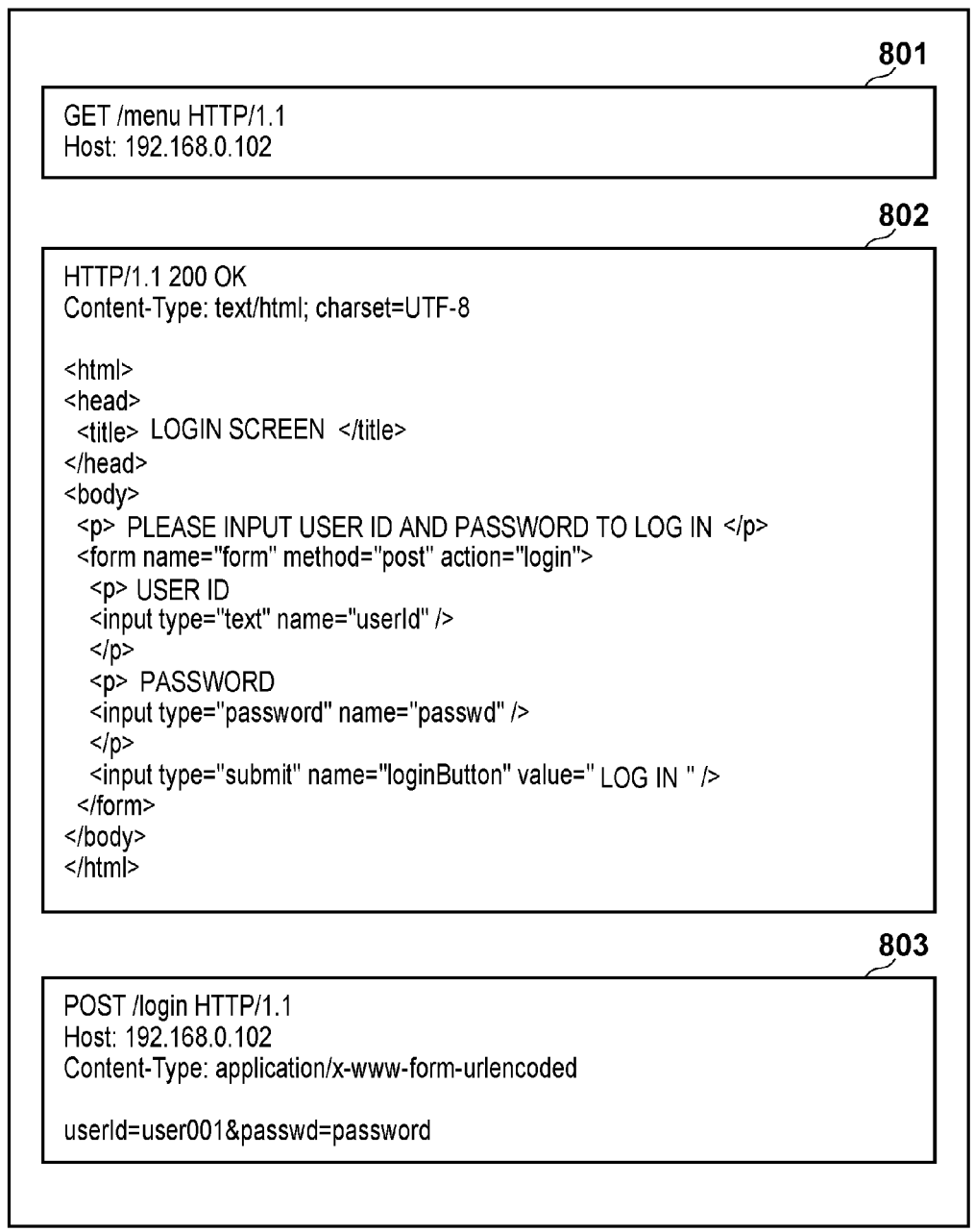

As shown in the example 801 of FIG. 8A, no cookie has been set in the first HTTP request from the Web browser 420. To request authentication information of the Web browser 420, therefore, the Web application 411 transmits the HTML data of the login screen 610 to the Web browser 420 as a response to the HTTP request. Reference numeral 802 in FIG. 8A denotes an example of the HTTP response transmitted in step S702, which contains, for example, HTML data representing the login screen 610. The example indicates that the login screen 610 provides a form for inputting a user ID "userID" and a password "passwd". The example also indicates that when the login button "loginButton" is pressed on the login screen 610, the user ID "userID" and the password "passwd" should be transmitted using the POST method with respect to the login screen indicated by a path name "login".

In step S703, in response to the request for authentication information using the login screen 610 from the Web application 411, the Web browser 420 transmits an HTTP request containing the authentication information for requesting a login operation to the Web application 411. Reference numeral 803 in FIG. 8A denotes an example of the HTTP request transmitted in step S703. This example indicates that "user001" and "password" have been input, as authentication information, to the user ID field and the password field of the login screen 610, respectively and the login button has been pressed.

In step S704, the Web application 411 executes authentication processing based on the authentication information received from the Web browser 420. When authentication succeeds, the Web application 411 generates a cookie (session ID) to be used for communication with the Web browser 420. Furthermore, the Web application 411 adds the generated cookie to an HTTP response (for example, sets it in an HTTP header), and transmits, to the Web browser 420, the HTTP response as a response to the HTTP request transmitted in step S703. With this operation, the Web application 411 designates, for the Web browser 420, that the cookie should be used for subsequent HTTP requests to be transmitted from the Web browser 420 to the Web application 411. Reference numeral 804 in FIG. 8B denotes an example of the HTTP response transmitted in step S704. In this example, the cookie "sid=84721340" has been added to the HTTP header.

In step S705, the Web browser 420 transmits an HTTP request for requesting the operation screen 630 to the Web application 411. Reference numeral 805 in FIG. 8B denotes an example of the HTTP request transmitted in step S705. In this example, the Web browser 420 requests an operation screen indicated by a path name "ftp" using the GET method. At this time, according to the designated cookie contained in the response received from the Web application 411 in step S704, the Web browser 420 sets the cookie "sid=84721340" in the HTTP header of the HTTP request to be transmitted.

In step S706, the Web application 411 transmits, as a response, an HTTP response containing the HTTP data of the operation screen 630 to the Web browser 420. Reference numeral 806 in FIG. 8B denotes an example of the HTTP response transmitted in step S706, which contains, for example, HTML data representing the operation screen 630. At this time, the Web application 411 transmits, as a response, the HTTP data of the operation screen 630 as a result of determining that the cookie has been set in the HTTP request from the Web browser 420. If no cookie has been set in the HTTP request, the Web application 411 transmits the HTTP data of the login screen 610 as a response, as in step S702.

The Web browser 420 displays the operation screen 630 on the LCD unit of the operation unit 219 using the HTTP data (screen information) which has been received from the Web application 411 in step S706, and accepts a user operation through the operation screen 630. In step S707, the Web browser 420 transmits, to the Web application 411, the user operation content on the operation screen 630. That is, the Web browser 420 transmits an HTTP request for requesting a control operation of the device of the MFP 101 to the Web application 411 by transmitting the operation content. The HTTP request is transmitted when the user presses the "execute" button 634 through the operation screen 630.

In response to reception of the HTTP request, the Web application 411 transmits a SOAP request (device control request) for requesting a control operation of the device of the MFP 101 to the service provider 430 of the MFP 101 in step S708. With this operation, the Web application 411 transmits, as a SOAP request, to the service provider 430, an instruction to execute a job (service) corresponding to the operation content on the operation screen 630 which has been received from the Web browser 420.

Furthermore, in step S708, the Web application 411 designates for the service provider 430 that the cookie generated in step S704 should be used as a cookie to be used for communication from the service provider 430 to the Web application 411. More specifically, the Web application 411 designates, for the service provider 430, the cookie generated in step S704 as a cookie which should be used when the service provider 430 transmits completion information indicating the execution result of a job to the Web application 411. In the embodiment, the Web application 411 executes the designation processing by adding the cookie generated in step S704 to the SOAP request to be transmitted in step S708.

Reference numeral 807 in FIG. 8C denotes an example of the SOAP request transmitted in step S708. In this example, the Web application 411 requests, using the POST method, an MFP 101 indicated by a host name "192.168.0.101" to execute a service. More specifically, the Web application 411 instructs the service provider 430 to execute a job for converting data obtained by scanning a document into a PDF file, and transmitting it to an FTP server.

Upon receiving the SOAP request transmitted in step S708, the service provider 430 generates a job for executing processing corresponding to the request. In the example 807 of FIG. 8C, a resolution 300×300 and full color are set as scan settings, the PDF format is set as document settings, and a host address "192.168.0.103" and a file name "test.pdf" are set as FTP settings. The service provider 430 generates a job for executing processing according to the settings, and executes the generated job. The example 807 of FIG. 8C shows that it is designated that, upon completion of execution of the job, with respect to the operation screen indicated by the path name "ftp", a job result should be sent and the cookie "sid=84721340" should be used to send the job result. The cookie designated by the Web application 411 is the same as that designated in step S704.

In step S709, the service provider 430 of the MFP 101 transmits, to the Web application 411 of the server 102, a SOAP response to respond to the SOAP request (device control request) accepted in step S708. In response to this, in step S710, the Web application 411 transmits the HTML data of the operation screen 630 as a response to the request in step S707. When the service provider 430 completes execution of the job generated according to the SOAP request accepted in step S708, the process advances to step S711.

In step S711, the service provider 430 transmits, to the Web application 411 without intervening the Web browser 420, an HTTP request for sending completion information indicating the execution result of the job corresponding to the SOAP request (device control request). The cookie designated in step S708 is added to the HTTP request. Reference numeral 808 in FIG. 8C denotes an example of the HTTP request transmitted in step S711. In this example, the cookie "sid=84721340" has been set in the HTTP request indicating that the job has successfully ended. The Web server 410 indicated by the host name "192.168.0.102" is notified of the HTTP request using the POST method with respect to the operation screen indicated by the path name "ftp". As described above using the example 807 of FIG. 8C, the cookie and the notification destination of the processing result contained in the HTTP request have been set according to the information designated by the SOAP request accepted in step S708.

In step S712, the Web application 411 transmits, as a response to the received processing result notification, an HTTP response to the service provider 430. Note that if no cookie has been added to the HTTP request (completion information notification) received in step S711, the Web application 411 transmits the HTML data of the login screen 610 as an HTTP response.

In step S713, upon press of the "logout" button 635 of the operation screen 630, the Web browser 420 transmits an HTTP request for requesting a logout operation to the Web application 411. In response to this, in step S714, the Web application 411 transmits an HTTP response containing HTML data representing the login screen 610 to the Web browser 420. In step S713 and subsequent steps (after logout), even if the Web browser 420 transmits an HTTP request set with the cookie previously used (the cookie obtained in step S704), the Web application 411 determines the cookie as an invalid one.

As described above, in the embodiment, a control operation is performed to use the same cookie for a session (communication) between the Web application 411 (server 102)

and the Web browser 420 and a session between the Web application 411 and the service provider 430. With this operation, the server 102 no longer requests the service provider 430 to perform authentication again when the server 102 requests, by a SOAP request, to execute a control operation after the Web browser 420 executes form authentication in response to a request from the server 102.

<Processing Procedure in Server 102>

Processing procedures executed by the Web application 411 of the server 102, and the service provider 430 and Web browser 420 of the MFP 101 will be respectively described with reference to flowcharts shown in FIGS. 9 to 12.

Figure 9:
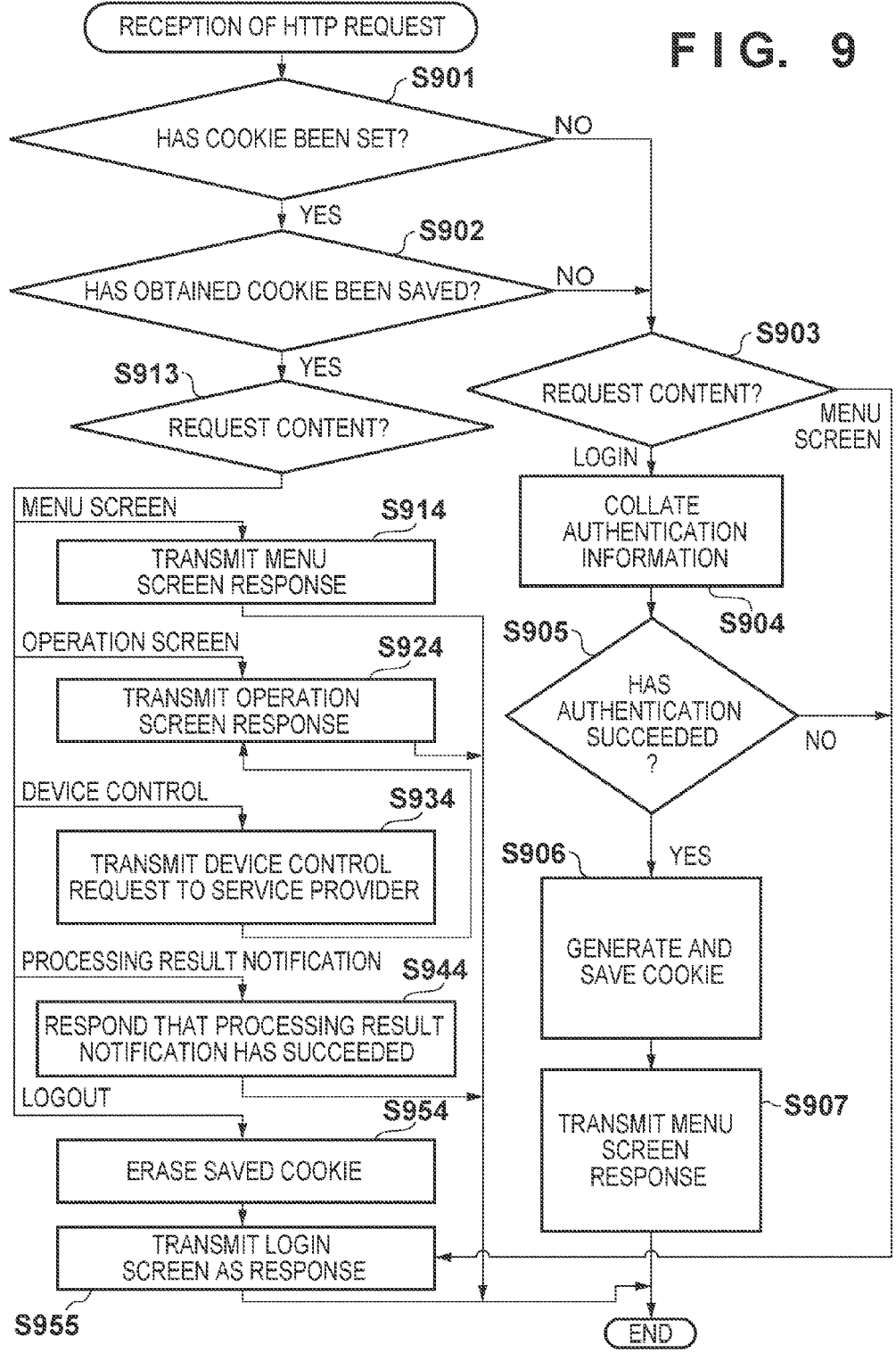
FIG. 9 is a flowchart illustrating a processing procedure executed by a Web application 411 of the server 102 when it receives an HTTP request according to the first embodiment of the present invention.

FIG. 9 is a flowchart illustrating a processing procedure executed by the Web application 411 of the server 102. Upon receiving an HTTP request such as that for requesting some screen information (from the Web browser 420 or service provider 430), the Web application 411 starts to execute processing in step S901 and subsequent steps. In step S901, the Web application 411 determines whether a cookie has been set in (added to) the HTTP header of the received HTTP request. If the Web application 411 determines that a cookie has been set, the process advances to step S902; otherwise, the process advances to step S903. If, for example, the Web browser 420 sends a request to the Web application 411 for the first time, no cookie has been set in the HTTP request. In this case, the process advances from step S901 to step S903.

In step S902, the Web application 411 determines whether the cookie obtained from the HTTP request has been saved in the session information management unit 412. If the Web application 411 determines that the obtained cookie has not been saved, it determines that the cookie is invalid, and advances the process to step S903.

In step S903, the Web application 411 determines a request content by the HTTP request. If the Web application 411 determines that obtaining of the menu screen 620 is requested, the process advances to step S955 because no cookie has been added to the HTTP request. In step S955, the Web application 411 transmits, as a response, an HTTP response containing the HTML data of the login screen 610 to request authentication information of the transmission source of the HTTP request, and terminates the process. Note that a redirection to the URL of the login screen 610 may be transmitted to terminate the process. On the other hand, if the Web application 411 determines in step S903 that login is requested, the process advances to authentication processing in steps S904 to S907.

In step S904, the Web application 411 collates the authentication information (a user ID and password) contained in the HTTP request (login request) with an authentication information repository. Based on the collation result in step S904, the Web application 411 determines in step S905 whether authentication has succeeded. If the Web application 411 determines that the authentication has succeeded, the process advances to step S906; otherwise, the process advances to step S955. In step S955, the Web application 411 transmits, as a response, an HTTP response containing the HTML data of the login screen 610, and terminates the process.

In step S906, the Web application 411 generates a cookie, and saves it in the session information management unit 412. As described with reference to FIG. 7, the generated cookie will be used in the session (communication) thereafter. In step S907, the Web application 411 generates an HTTP response containing the HTML data of the menu screen 620, and transmits it as a response. As shown in the example 804 of FIG. 8B, the HTTP response set with the cookie generated in step S906 is sent to the Web browser 420.

Processing in step S913 and subsequent steps will be explained next. As described above, if authentication using the login screen (authentication screen) 610 has succeeded, the Web browser 420 transmits, to the Web application 411, the HTTP request in which a cookie has been set as session information. In this case, the process advances to steps S901, S902, and S913 in FIG. 9 in the order named. In step S913, the Web application 411 determines a request content by the HTTP request. In this example, the request content indicates obtaining of the menu screen 620, obtaining of the operation screen 630, a request for a device control operation, a processing result notification indicating the execution result of a job, or a logout request. If the Web application 411 determines that the request content indicates obtaining of the menu screen 620, obtaining of the operation screen 630, a device control operation, a processing result notification, or a logout request, the process advances to step S914, S924, S934, S944, or S954, respectively.

In step S914, the Web application 411 transmits, as a response, an HTTP response containing the HTML data of the menu screen 620 to the Web browser 420, and terminates the process. In step S924, the Web application 411 transmits, as a response, an HTTP response containing the HTML data of the operation screen 630 to the Web browser 420, and terminates the process. In step S934, the Web application 411 transmits a SOAP request for requesting a device control operation to the service provider 430, and advances the process to step S924 described above. Note that the SOAP request is added with a cookie used in a session between the Web application 411 and the Web browser 420, as described above.

In step S944, the Web application 411 transmits an HTTP response to the Web browser 420 to respond that the execution result notification of the job has succeeded, and terminates the process. In step S954, the Web application 411 deletes, from the session information management unit 412, the cookie obtained from the HTTP request. In step S955, the Web application 411 transmits, as a response, an HTTP response containing the HTML data of the login screen 610 to the Web browser 420, and terminates the process.

The Web browser 420 can set the same cookie as that previously used in an HTTP request to be transmitted to the server 102 (Web application 411) after logout. In this case, however, since the cookie is not saved in the session information management unit 412, the process advances to steps S901, S902, S903, and S955 in FIG. 9 in the order named. Consequently, the Web application 411 determines the cookie set in the HTTP request as an invalid one, and transmits a response containing the HTML data of the login screen 610 to the Web browser 420.

<Processing Procedure in MFP 101>

Figure 10:
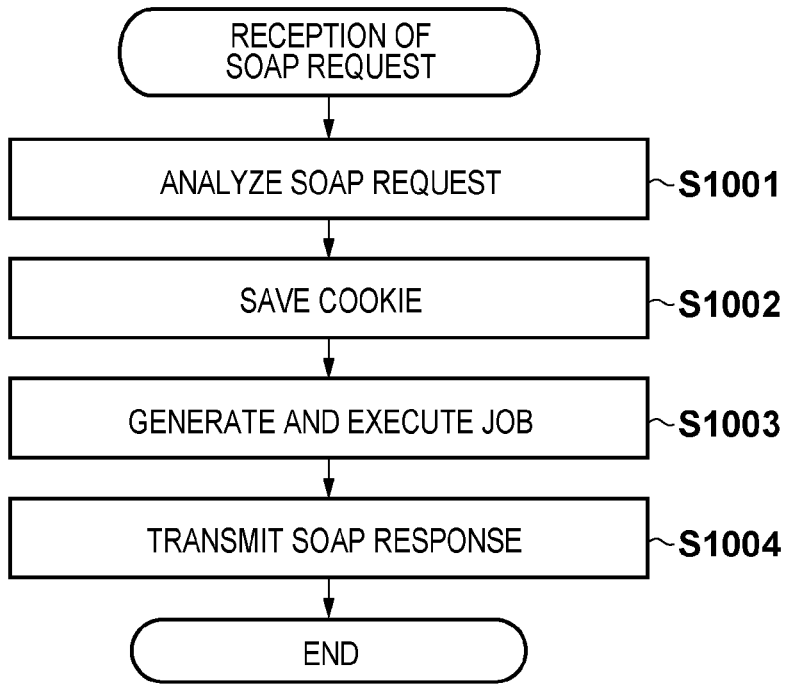
FIG. 10 is a flowchart illustrating a processing procedure executed by a service provider 430 of the MFP 101 when it receives a SOAP request according to the first embodiment of the present invention.
Figure 11:
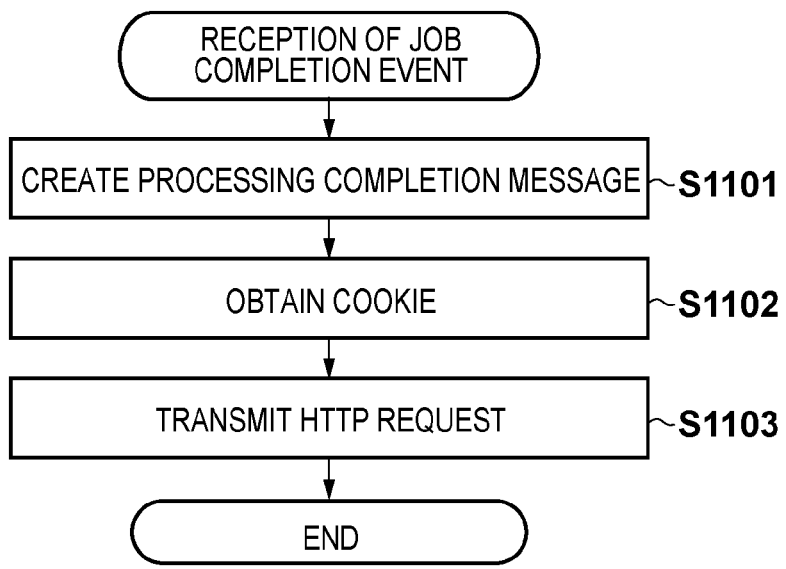
FIG. 11 is a flowchart illustrating a processing procedure executed by the service provider 430 of the MFP 101 when it receives a job completion event according to the first embodiment of the present invention.

FIGS. 10 and 11 are flowcharts illustrating a processing procedure executed by the service provider 430 of the MFP 101. When the service provider 430 uses the communication unit 431 to receive a SOAP request as a device control request from the Web application 411 of the server 102, it starts to execute processing in step S1001 and subsequent steps in FIG. 10. In step S1001, the service provider 430 causes the analysis unit 432 to analyze a request content by the SOAP request. Upon completion of execution of a job, in step S1002, the service provider 430 causes the job control unit 433 to save, based on the analysis result in step S1001, in the session information management unit 434, a cookie and the domain name of a notification destination to be notified of the execution result of the job.

In step S1003, the service provider 430 causes the job control unit 433 to generate a job for executing a device control operation based on the analysis result in step S1001, and to start to execute the job. In step S1004, the service provider 430 causes the communication unit 431 to transmit, as a response, a SOAP response indicating that the device control request has been accepted, and then terminates the process.

After that, upon receiving a job completion event indicating completion of execution of the job from a device to be controlled, the service provider 430 starts to execute processing in step S1101 and subsequent steps in FIG. 11. Note that the job completion event is an event of which the device to be controlled notifies the job control unit 433 upon completion of execution of the processing included in the job described with reference to FIG. 10.

In step S1101, the service provider 430 causes the job control unit 433 to generate, as completion information indicating the execution result of the job, processing completion information indicating completion of the requested device control operation. Note that the processing completion information contains information indicating normal end, cancel end, abnormal end, or the like depending on the received job completion event. In step S1102, the service provider 430 causes the job control unit 433 to obtain a cookie corresponding to the domain name of the notification destination of the processing completion information from the session information management unit 434. In step S1103, the service provider 430 causes the communication unit 431 to transmit an HTTP response set with the processing completion information and cookie to the Web application 411 (corresponding to the domain name of the notification destination) without intervening the Web browser 420, and terminates the process.

Figure 12:
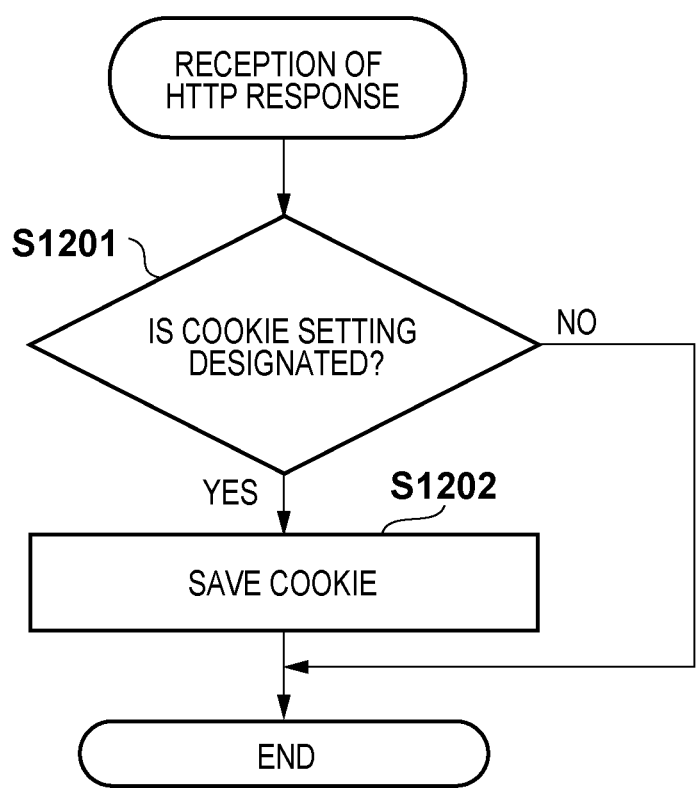
FIG. 12 is a flowchart illustrating a processing procedure executed by a Web browser 420 of the MFP 101 when it receives an HTTP response according to the first embodiment of the present invention.

FIG. 12 is a flowchart illustrating a processing procedure executed by the Web browser 420 of the MFP 101. When the Web browser 420 uses the communication unit 421 to receive an HTTP response, it starts to execute processing in step S1201 and subsequent steps. In step S1201, the Web browser 420 causes the analysis unit 422 to determine whether the HTTP response contains an instruction to set a cookie. If the Web browser 420 determines that cookie setting is instructed, the process advances to step S1202; otherwise, the process ends. In step S1202, the Web browser 420 causes the session information management unit 424 to save a host name as a transmission destination when the HTTP request is transmitted and the cookie analyzed in step S1201, and terminates the process.

As described above, in the information processing system according to the embodiment, when authentication using authentication information sent from the Web browser 420 of the MFP 101 succeeds, the server 102 (Web application 411) generates a session ID (cookie). Furthermore, if the server 102 transmits screen information in response to a request from the Web browser 420, it adds the generated session ID to the screen information. The Web browser 420 displays an operation screen based on the screen information received from the server 102, and accepts an operation through the operation screen. When the Web browser 420 transmits, to the server 102, an operation content on the displayed operation screen, the server 102 transmits a SOAP request for executing a job corresponding to the operation content to the service provider 430 of the MFP 101. At this time, the server 102 designates a session ID which should be used to transmit information from the service provider 430 to the server 102 thereafter. The session ID is designated by, for example, adding it to the SOAP request. Upon completion of execution of the job corresponding to the SOAP request, the service provider 430 adds the designated session ID to completion information indicating the execution result, and transmits the completion information to the server 102.

As described above, the server 102 notifies (designates) the service provider 430 of a session ID, which has been generated based on authentication processing for communication with the Web browser 420 of the MFP 101, so that the session ID can be used for communication between the service provider 430 and the server 102. This enables the MFP 101 to notify the server 102 of completion information indicating the execution result of the job executed according to the SOAP request (instruction) sent from the server 102 without requesting further authentication processing by the server 102.

Second Embodiment

The second embodiment of the present invention will be described next. In the first embodiment, the service provider 430 of the MFP 101 uses a session ID (cookie) designated by the server 102 (Web application 411) in step S708 to transmit, to the server 102, the execution result of a job corresponding to an instruction sent from the server 102. Unlike the first embodiment, in the second embodiment, a server 102 does not designate a session ID for a service provider 430 of an MFP 101. Instead, the service provider 430 refers to a session ID already used between a Web browser 420 of the MFP 101 and the server 102, and transmits the execution result of a job to the server 102 using the session ID. Note that different parts from the first embodiment will be mainly described below.

Figure 13:
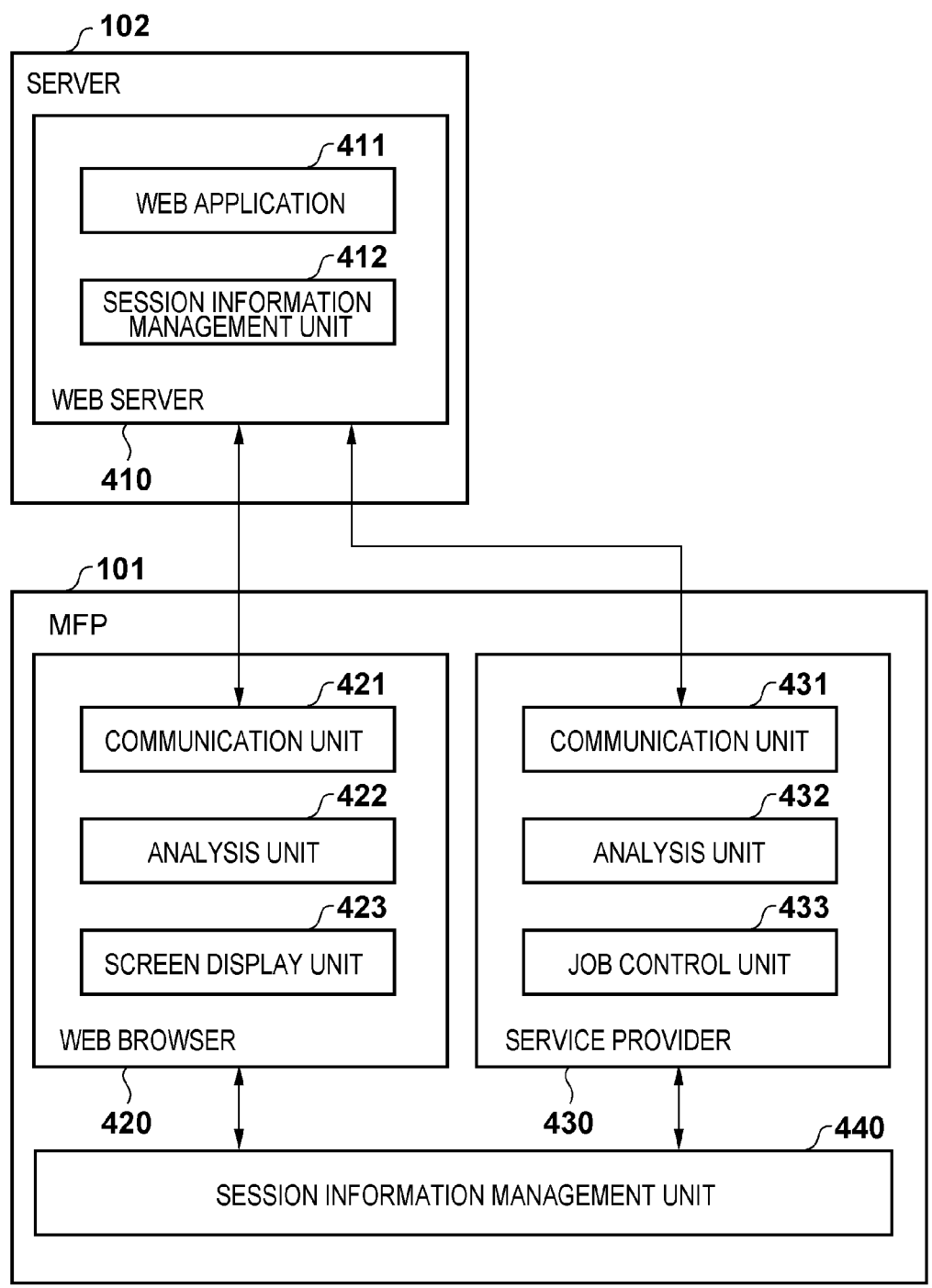
FIG. 13 is a block diagram showing the software configuration of an information processing system 100 according to the second embodiment of the present invention.

FIG. 13 is a block diagram showing the software configuration of an information processing system 100 according to the second embodiment. Similarly to FIG. 4 in the first embodiment, each function unit shown in FIG. 13 is implemented when a CPU 211 of the MFP 101 or a CPU 311 of the server 102 executes a control program. A different point from the first embodiment is the location of a session information management unit in the MFP 101. In the first embodiment (FIG. 4), the Web browser 420 has the session information management unit 424 and the service provider 430 has the session information management unit 434. On the contrary, in this embodiment, a session information management unit 440 common to the Web browser 420 and service provider 430 is provided in the MFP 101.

The session information management unit 440 manages session information such as a session ID used for communication between the server 102 and the Web browser 420, and also manages session information used for communication between the server 102 and the service provider 430. The Web browser 420 and the service provider 430 can respectively instruct the common session information management unit 440 to save, obtain, and delete session information.

Unlike step S708 in the first embodiment, in this embodiment, when a Web application 411 transmits a SOAP request to the service provider 430, it does not designate any cookie. Upon completion of execution of a job corresponding to the SOAP request, the service provider 430 uses, as a cookie to be added to completion information indicating the execution result of the job, a cookie obtained from the session information management unit 440. The cookie corresponds to a cookie which is generated by the Web application 411 and transmitted to the Web browser 420 in step S704. The session information management unit 440 manages (saves) the cookie received from the Web application 411 in step S704.

As described above, in the embodiment, the service provider 430 of the MFP 101 also uses the session ID (cookie) which has been received by the Web browser 420 from the server 102 (Web application 411). More specifically, to notify the server 102 of the execution result of the job corresponding to the SOAP request sent from the server 102, the MFP 101 transmits, to the server 102, the notification added with the cookie which has been received by the Web browser 420 and saved in the session information management unit 440. This enables to obtain the same advantages as those in the first embodiment without processing of designating, by the server 102, a cookie to be used for the service provider 430 of the MFP 101.

Other Embodiments

Although the Web server 410 provides form authentication in the above-described embodiments, the present invention is not limited to this. For example, when the Web server 410 provides HTTP authentication other than the form authentication, it may instruct the service provider 430 to set session information in a predetermined HTTP header other than a cookie. In this case, the service provider 430 need only set the HTTP header according to the instruction sent from the Web server 410, and send an HTTP request to the Web server 410.

Although a device control operation and session information are designated by transmitting a SOAP request from the Web server 410 to the service provider 430 in the above-described embodiments, the use mode of the service provider 430 is not limited to this. For example, the service provider 430 may be controlled by designating a device control operation and session information using an HTTP response transmitted as a response by the Web application 411. Furthermore, the Web server 410 may control the service provider 430 asynchronously with the Web browser 420 by designating a device control operation and session information using Java®Script.

In the above-described embodiments, the Web application 411 deletes session information upon receiving a logout request from the Web browser 420. The Web application 411, however, may delete session information upon receiving a job completion notification from the service provider 430.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing system comprising a server apparatus and an information processing apparatus capable of communicating with said server apparatus, including a display control unit that performs control to display an operation screen on a display unit using screen information provided by said server apparatus, and an execution control unit that performs control to execute a job for transmitting data according to an instruction from said server apparatus, said server apparatus comprising:
a generation unit that generates, when an authentication using authentication information received from said display control unit succeeds, a session identifier to be used for communication with said display control unit;
a first transmission unit that transmits the screen information and the session identifier generated by said generation unit to said display control unit;
a second transmission unit that transmits, upon receiving from said display control unit an operation content on the operation screen based on the screen information, an instruction for executing a job for transmitting data to an external apparatus which is different from said server apparatus based on the operation content to said execution control unit;
a designation unit that designates, for said execution control unit, as a session identifier to be used for communication from said execution control unit to said server apparatus, the session identifier generated by said generation unit; and
a reception unit that receives, from said execution control unit, completion information indicating completion of the job executed according to the instruction,
said display control unit of said information processing apparatus comprising:
a displaying unit that displays the operation screen on the display unit using the screen information received from said server apparatus; and
a third transmission unit that transmits, to said server apparatus, the operation content on the operation screen, and
said execution control unit of said information processing apparatus comprising:
an execution unit that executes, upon receiving the instruction from said server apparatus, the job according to the instruction; and
a fourth transmission unit that transmits, upon completion of the job, to said server apparatus without intervening said display control unit, completion information indicating completion of the job and the session identifier designated by said designation unit.

2. The system according to claim 1, wherein said designation unit designates a session identifier to be used for communication from said execution control unit to said server apparatus by adding the session identifier generated by said generation unit to the instruction transmitted to said execution control unit.

3. The system according to claim 1, wherein
said display control unit of said information processing apparatus further comprises:
a first request unit that requests the screen information of said server apparatus; and
a fifth transmission unit that transmits the authentication information to said server apparatus in response to a request from said server apparatus, and
said server apparatus further comprises:
a determination unit that determines, upon receiving the request for the screen information from said display control unit, whether the request has been added with the session identifier already generated by said generation unit;
a second request unit that requests, when a determination is made that the request for the screen information has not been added with the session identifier, the authentication information of said display control unit; and an authentication unit that performs, upon receiving the authentication information from said display control unit, an authentication using the authentication information.

4. The system according to claim 1, wherein
said execution unit further comprises:
a second generation unit that generates, upon receiving the instruction from said server apparatus, the job;
a second execution unit that executes the job generated by the second generation unit; and
a third generation unit that generates, upon completion of the job generated by the second generation unit, the completion information indicating completion of the job generated by the second generation unit.

5. An information processing system comprising a server apparatus and an information processing apparatus capable of communicating with said server apparatus, including a display control unit that performs control to display an operation screen on a display unit using screen information provided by said server apparatus, and an execution control unit that performs control to execute a job for transmitting data according to an instruction from said server apparatus,
said server apparatus comprising:
a generation unit that generates, when an authentication using authentication information received from said display control unit succeeds, a session identifier to be used for communication with said display control unit;
a first transmission unit that transmits the screen information and the session identifier generated by said generation unit to said display control unit;
a second transmission unit that transmits, upon receiving from said display control unit an operation content on the operation screen based on the screen information, an instruction for executing a job for transmitting data to an external apparatus which is different from said server apparatus based on the operation content to said execution control unit; and
a reception unit that receives, from said execution control unit, completion information indicating completion of the job executed according to the instruction,
said display control unit of said information processing apparatus comprising:
a displaying unit that displays the operation screen on the display unit using the screen information received from said server apparatus; and
a third transmission unit that transmits, to said server apparatus, the operation content on the operation screen, and
said execution control unit of said information processing apparatus comprising:
an execution unit that executes, upon receiving the instruction from said server apparatus, the job according to the instruction; and
a fourth transmission unit that transmits, upon completion of the job, to said server apparatus without intervening said display control unit, completion information indicating completion of the job and the session identifier used for communication between said display control unit and said server apparatus.

6. The system according to claim 5, wherein
said information processing apparatus further comprises a management unit that manages a session identifier used for communication between said server apparatus and said display control unit, and
said third transmission unit obtains, from said management unit, the session identifier used for communication between said display control unit and said server apparatus, and transmits the completion information and the obtained session identifier to said server apparatus.

7. An information processing apparatus capable of communicating with a server apparatus, including a display control unit that performs control to display an operation screen on a display unit using screen information provided by the server apparatus, and an execution control unit that performs control to execute a job for transmitting data according to an instruction from the server apparatus,
said display control unit comprising:
a reception unit that receives, in response to a success of an authentication using authentication information transmitted to the server apparatus, the screen information and a session identifier that has been generated by the server apparatus as a session identifier to be used for communication between said display control unit and the server apparatus, and displays the operation screen on the display unit using the screen information; and
a first transmission unit that transmits, to the server apparatus, an operation content on the operation screen, and
said execution control unit comprising:
an execution unit that executes, upon receiving an instruction for executing a job for transmitting data to an external apparatus which is different from the server apparatus based on the operation content, the job; and
a second transmission unit that transmits, upon completion of the job, to the server apparatus without intervening said display control unit, completion information indicating completion of the job and the session identifier that has been generated by the server apparatus and designated as a session identifier to be used for communication from said execution control unit to the server apparatus.

8. An information processing apparatus capable of communicating with a server apparatus, including a display control unit that performs control to display an operation screen on a display unit using screen information provided by the server apparatus, and an execution control unit that performs control to execute a job for transmitting data according to an instruction from the server apparatus,
said display control unit comprising:
a reception unit that receives, in response to a success of an authentication using authentication information transmitted to the server apparatus, the screen information and a session identifier that has been generated by the server apparatus as a session identifier to be used for communication between said display control unit and the server apparatus, and displays the operation screen on the display unit using the screen information; and
a first transmission unit that transmits, to the server apparatus, an operation content on the operation screen, and
said execution control unit comprising:
an execution unit that executes, upon receiving an instruction for executing a job for transmitting data to an external apparatus which is different from the server apparatus based on the operation content from the server apparatus, the job; and
a second transmission unit that transmits, upon completion of the job, to the server apparatus without intervening said display control unit, completion information indicating completion of the job and the session identifier used for communication between said display control unit and the server apparatus.

9. A control method for an information processing system comprising a server apparatus and an information processing apparatus capable of communicating with the server apparatus, including a display control unit that performs control to display an operation screen on a display unit using screen information provided by the server apparatus, and an execution control unit that performs control to execute a job for transmitting data according to an instruction from the server apparatus, the method comprising causing the server apparatus to perform:
a generation step of generating, when an authentication using authentication information received from the display control unit succeeds, a session identifier to be used for communication with the display control unit;
a step of transmitting the screen information and the session identifier generated in the generation step to the display control unit; and
a step of transmitting, upon receiving from the display control unit an operation content on the operation screen based on the screen information, an instruction for executing a job for transmitting data to an external apparatus which is different from the server apparatus based on the operation content to the execution control unit;
a designation step of designating, for the execution control unit, as a session identifier to be used for communication from the execution control unit to the server apparatus, the session identifier generated in the generation step; and
a reception step of receiving, from the execution control unit, completion information indicating completion of the job executed according to the instruction,
causing the display control unit of the information processing apparatus to perform:
a step of displaying the operation screen on the display unit using the screen information received from the server apparatus; and
a step of transmitting, to the server apparatus, the operation content on the operation screen, and
causing the execution control unit of the information processing apparatus to perform:
an execution step of executing, upon receiving the instruction from the server apparatus, the job according to the instruction; and
a step of transmitting, upon completion of the job, to the server apparatus without intervening the display control unit, completion information indicating completion of the job and the session identifier designated in the designation step.

10. A control method for an information processing system comprising a server apparatus and an information processing apparatus capable of communicating with the server apparatus, including a display control unit that performs control to display an operation screen on a display unit using screen information provided by the server apparatus, and an execution control unit that performs control to execute a job for transmitting data according to an instruction from the server apparatus, the method comprising causing the server apparatus to perform:
a generation step of generating, when an authentication using authentication information received from the display control unit succeeds, a session identifier to be used for communication with the display control unit;
a step of transmitting the screen information and the session identifier generated in the generation step to the display control unit;
a step of transmitting, upon receiving from the display control unit an operation content on the operation screen based on the screen information, an instruction for executing a job for transmitting data to an external apparatus which is different from the server apparatus based on the operation content to the execution control unit; and
a reception step of receiving, from the execution control unit, completion information indicating completion of the job executed according to the instruction,
causing the display control unit of the information processing apparatus to perform:
a step of displaying the operation screen on the display unit using the screen information received from the server apparatus; and
a step of transmitting, to the server apparatus, the operation content on the operation screen, and
causing the execution control unit of the information processing apparatus to perform:
a step of executing, upon receiving the instruction from the server apparatus, the job according to the instruction; and
a transmission step of transmitting, upon completion of the job, to the server apparatus without intervening the display control unit, completion information indicating completion of the job and the session identifier used for communication between the display control unit and the server apparatus.

11. A control method for an information processing apparatus capable of communicating with a server apparatus, including a display control unit that performs control to display an operation screen on a display unit using screen information provided by the server apparatus, and an execution control unit that performs control to execute a job for transmitting data according to an instruction from the server apparatus, the method comprising causing the display control unit to perform:
a step of receiving, in response to a success of an authentication using authentication information transmitted to the server apparatus, the screen information and a session identifier that has been generated by the server apparatus as a session identifier to be used for communication between the display control unit and the server apparatus, and displaying the operation screen on the display unit using the screen information; and
a step of transmitting, to the server apparatus, an operation content on the operation screen, and
causing the execution control unit to perform:
a step of executing, upon receiving an instruction for executing a job for transmitting data to an external apparatus which is different from the server apparatus based on the operation content from the server apparatus, the job; and
a step of transmitting, upon completion of the job, to the server apparatus without intervening the display control unit, completion information indicating completion of the job and the session identifier that has been generated by the server apparatus and designated as a session identifier to be used for communication from the execution control unit to the server apparatus.

12. A control method for an information processing apparatus capable of communicating with a server apparatus, including a display control unit that performs control to display an operation screen on a display unit using screen information provided by the server apparatus, and an execution control unit that performs control to execute a job for transmitting data according to an instruction from the server apparatus, the method comprising causing the display control unit to perform:
a step of receiving, in response to a success of an authentication using authentication information transmitted to the server apparatus, the screen information and a session identifier that has been generated by the server apparatus as a session identifier to be used for communication between the display control unit and the server apparatus, and displaying the operation screen on the display unit using the screen information; and a step of transmitting, to the server apparatus, an operation content on the operation screen, and causing the execution control unit to perform:

a step of executing, upon receiving an instruction for executing a job for transmitting data to an external apparatus which is different from the server apparatus based on the operation content from the server apparatus, the job; and a step of transmitting, upon completion of the job, to the server apparatus without intervening the display control unit, completion information indicating completion of the job and the session identifier that has been generated by the server apparatus and designated as a session identifier to be used for communication from the execution control unit to the server apparatus.

13. A non-transitory computer-readable storage medium storing a computer program that, when executed by a computer, causes the computer to function as an information processing apparatus capable of communicating with a server apparatus, including a display control unit that performs control to display an operation screen on a display unit using screen information provided by the server apparatus, and an execution control unit that performs control to execute a job for transmitting data according to an instruction from the server apparatus, said display control unit comprising:

a reception unit that receives, in response to a success of an authentication using authentication information transmitted to the server apparatus, the screen information and a session identifier that has been generated by the server apparatus as a session identifier to be used for communication between said display control unit and the server apparatus, and displays the operation screen on the display unit using the screen information; and a first transmission unit that transmits, to the server apparatus, an operation content on the operation screen, and said execution control unit comprising:

an execution unit that executes, upon receiving an instruction for executing a job for transmitting data to an external apparatus which is different from the server apparatus based on the operation content, the job; and a second transmission unit that transmits, upon completion of execution of the job, to the server apparatus without intervening said display control unit, completion information indicating completion of the job and the session identifier that has been generated by the server apparatus and designated as a session identifier to be used for communication from said execution control unit to the server apparatus.

14. A non-transitory computer-readable storage medium storing a computer program that, when executed by a computer, causes the computer to function as an information processing apparatus capable of communicating with a server apparatus, including a display control unit that performs control to display an operation screen on a display unit using screen information provided by the server apparatus, and an execution control unit that performs control to execute a job for transmitting data according to an instruction from the server apparatus, said display control unit comprising:

a reception unit that receives, in response to a success of an authentication using authentication information transmitted to the server apparatus, the screen information and a session identifier that has been generated by the server apparatus as a session identifier to be used for communication between said display control unit and the server apparatus, and displaying the operation screen on the display unit using the screen information; and a first transmission unit that transmits, to the server apparatus, an operation content on the operation screen, and said execution control unit comprising:

an execution unit that executes, upon receiving an instruction for executing a job for transmitting data to an external apparatus which is different from the server apparatus based on the operation content, the job; and a second transmission unit that transmits, upon completion of the job, to the server apparatus without intervening said display control unit, completion information indicating completion of the job and the session identifier used for communication between said display control unit and the server apparatus.

\* \* \* \* \*